United States Patent [19]

Loren

[11] Patent Number: 5,204,050
[45] Date of Patent: Apr. 20, 1993

[54] GAS ASSISTED INJECTION MOLDING

[76] Inventor: Norman S. Loren, 24874 Chalk Farm Rd., Warren, Mich. 48091

[21] Appl. No.: 773,707

[22] Filed: Oct. 9, 1991

[51] Int. Cl.$^5$ .................... B29C 45/00; B29C 45/20; B29C 45/34
[52] U.S. Cl. .................... 264/504; 264/572; 425/812
[58] Field of Search .............. 264/572, 504, 328.1, 264/328.8, 328.12, 50, 101, 102; 425/812, 542, 546, 564, 522

[56] References Cited

U.S. PATENT DOCUMENTS

| | | | |
|---|---|---|---|
| 4,092,389 | 5/1978 | Sakurai | 264/504 |
| 4,104,353 | 8/1978 | Monnet | 264/255 |
| 4,685,881 | 8/1987 | Saski | 425/562 |
| 4,740,150 | 4/1988 | Sayer | 425/542 |
| 4,824,732 | 4/1989 | Hendry | 428/542 |
| 4,923,666 | 5/1990 | Yamazaki | 264/572 |
| 4,923,667 | 5/1990 | Sayer | 264/572 |
| 4,935,191 | 6/1990 | Baxi | 264/572 |
| 4,942,006 | 7/1990 | Loren | 264/50 |
| 4,943,407 | 7/1990 | Hendry | 264/572 |
| 4,944,910 | 7/1990 | Hendry | 264/572 |
| 5,028,377 | 7/1991 | Hendry | 264/572 |
| 5,054,689 | 10/1991 | Hunerberg et al. | 425/564 |
| 5,069,858 | 12/1991 | Hendry | 264/328.12 |
| 5,078,949 | 1/1992 | Strunk et al. | 264/572 |
| 5,090,886 | 2/1992 | Jaroschek | 264/572 |
| 5,096,655 | 3/1992 | Baxi et al. | 264/572 |

FOREIGN PATENT DOCUMENTS

| | | |
|---|---|---|
| 0289230 | 4/1988 | European Pat. Off. . |
| 0309257 | 9/1989 | European Pat. Off. . |
| WO90/00466 | 1/1990 | PCT Int'l Appl. .......... 264/572 |
| 2139548B | 5/1983 | United Kingdom . |
| 2139549A | 5/1983 | United Kingdom . |

Primary Examiner—Jan H. Silbaugh
Assistant Examiner—Catherine Timm
Attorney, Agent, or Firm—Krass & Young

[57] ABSTRACT

A gas assisted injection molding method and apparatus wherein articles are produced by injecting molten resin into a mold cavity and then injecting a quantity of pressurized gas into the resin to fill out the mold cavity and form a hollow in the resin. Following the injection of the gas into the resin to form the hollow, gas is injected into the resin in the mold cavity at a second location. The gas injected at the second location may either form a separate hollow within the resin or may form a passage extending through the resin for communication with the hollow formed by the gas injected at the first location. The first location is preferably the resin injection location and the second location is preferably a location communicating directly with the mold cavity. Gas is vented from the article either at the first location, the second location, or both locations. The injection of the gas at the first and second locations, and the venting of the gas at the first and second locations, is separately controlled and regulated so that the gas may be injected at different pressures at the different locations, the gas may be injected or vented in a sequential manner at the different locations, and the gas may be vented from the first location until the pressure reaches a predetermined reduced level whereafter the gas may be vented from the second location to reduce the gas pressure to ambient.

20 Claims, 4 Drawing Sheets

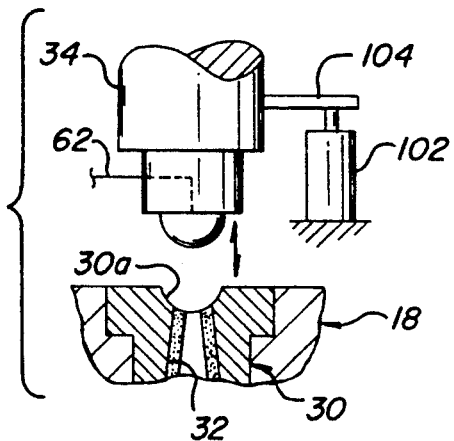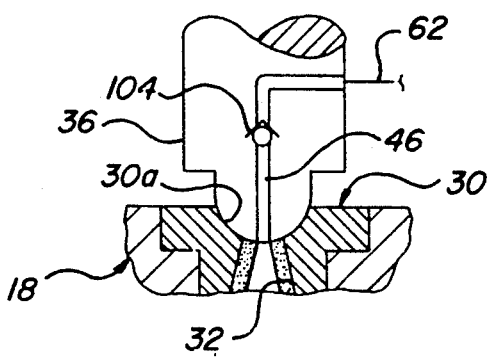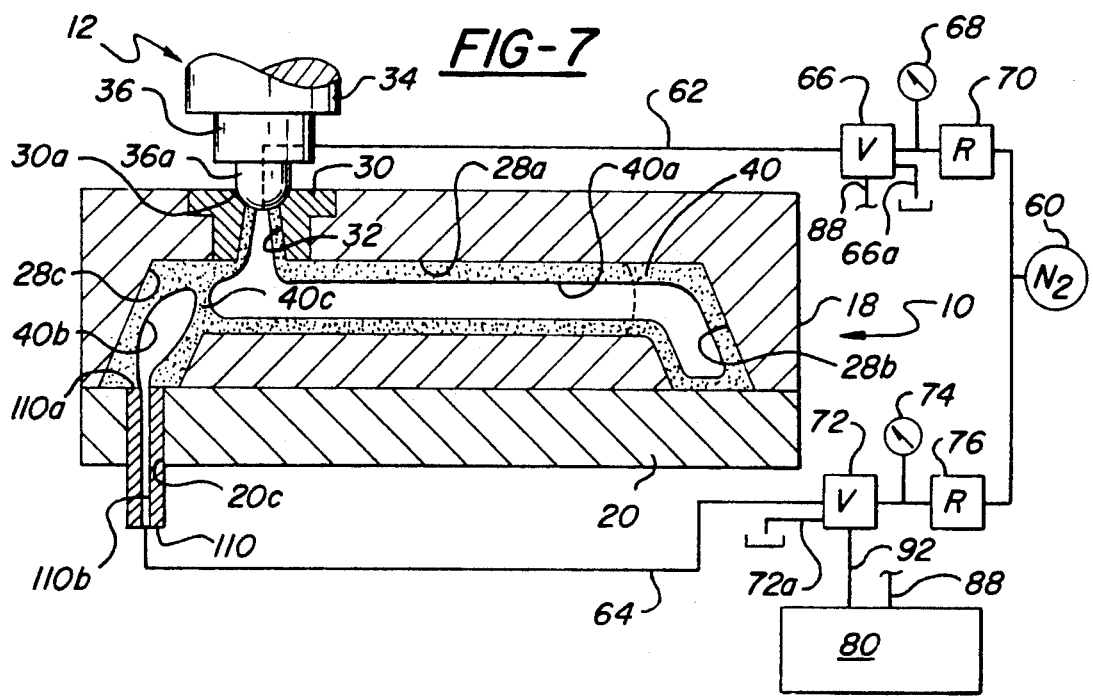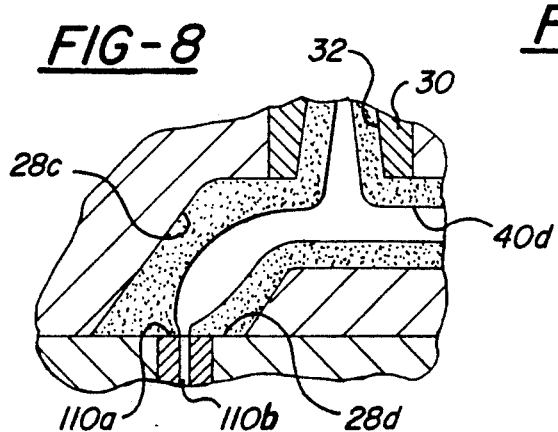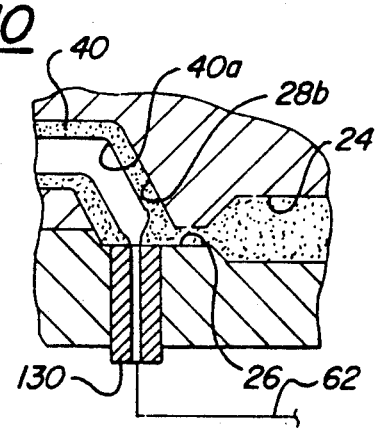

GAS ASSISTED INJECTION MOLDING

FIELD OF THE INVENTION

This invention relates to injection molding and more particularly to gas assisted injection molding.

BACKGROUND OF THE INVENTION

It is desirable in injection molding to urge the molten thermoplastic resin material into contact with the mold surfaces by exerting pressure on the resin. This aids the external surface of the plastic material in assuming the precise shape dictated by the mold surface. The pressure also assists the filling of the mold with molten resin even if the mold cavity is elongated or narrow and/or is otherwise difficult to fill.

In gas assisted injection molding, the articles are produced by injecting molten resin into the mold cavity and then injecting a quantity of pressurized gas into the resin to fill out the mold cavity and form a hollow gas space in the resin. The gas is preferably an inert gas such, for example, as nitrogen. Pressure is maintained on the gas in the hollow gas space within the resin until the resin has sufficiently set whereafter the pressurized gas is released from the molded part hollow space and the molded part is removed from the mold cavity.

The gas assisted procedure is advantageous since the molded part produced utilizes somewhat less plastic material and is lighter than if the part were solid plastic. More importantly, the plastic in the gas assisted procedure will not have a tendency to shrink away from the mold walls during cooling since the internal gas pressure will keep it pressed against the walls, thereby minimizing or eliminating surface blemishes such as sink marks. Further, the gas assisted procedure eliminates the need to utilize the screw ram of the injection molding machine to pack out the mold during the molding cycle, thereby minimizing or eliminating molded-in stresses in the molded part.

Whereas the gas assisted injection molding process offers many advantages, some of which are enumerated above, as compared to injection molding without gas assistance, the known gas assistance processes embody certain limitations and disadvantages.

Specifically, in the gas process it is desirable to inject a gas from a location upstream of the mold cavity to fill out the mold cavity along the general flow path of the injected resin, and preferably, to inject the gas at the resin injection location so as to use a portion of the resin contained in the sprue and runner for material savings. However, venting of the gas through the gas injection passageways may entrain resin particles with the result that the runner, sprue, or injection nozzle passageways may become blocked. Blockage of these passageways results in down time of the apparatus to remove the blockage and further results in incomplete venting of the molded article with the result that the molded article may rupture, due to internal pressure, when the mold is opened.

Blockage of the runner, sprue and nozzle passageways may be minimized or eliminated by delaying the venting operation until such time as the resin has generally hardened, but this delay lengthens the cycle time for each part and increases the cost of each part. It has been proposed to inject the gas directly into the mold cavity and vent the gas directly from the mold cavity. Whereas this arrangement may allow earlier venting with resultant savings in per part cost, it does not permit usage of resin contained within the sprue and runner to fill out the mold cavity, nor does the gas readily flow through the resin upstream of the injection location so that the resin is not adequately packed out against the cavity wall at locations upstream of the injection location and may pull away from the cavity wall, with resultant sink marks, during the cooling process.

SUMMARY OF THE INVENTION

The present invention is directed to the provision of an improved gas assisted injection molding process and apparatus.

More specifically, the present invention is directed to the provision of a gas assisted molding process and apparatus which allows a shorter cycle time; reduces machine down time; saves resin; and produces a better quality part.

The invention methodology is directed to providing gas assistance in a resin injection molding process of the type in which hot resin is injected into a mold, gas is injected into the resin to fill out the mold cavity, the resin cools, the gas is vented, and the mold is opened to remove the molded part.

According to the invention, the gas is injected into the resin at spaced first and second locations and the parameters of the gas injection and venting are controlled in a manner to optimize the gas injection process.

According to one feature of the invention, the pressure at which the gas is injected into the resin at the first and second locations is separately regulated. This arrangement, for example, allows a relatively low pressure gas to be initially injected into the resin at the first location and a relatively high pressure gas to be injected into the resin at the second location to optimize the packing out of the resin in the mold cavity.

According to a further feature of the invention, the gas is injected into the resin at the first location to create a hollow in the resin to fill out the mold cavity and the gas is thereafter injected at a second gas location to create a passage in the resin extending into the hollow. The gas injected at the second location is preferably at a higher pressure than the gas injected at the first location. This arrangement allows the relatively high pressure gas at the second location to optimize the pack out of the resin and further allows the gas to be vented at the second location. The venting at the second location may comprise the only venting of the gas or may complement venting of the gas at the first location.

According to a further feature of the invention, the first location is the resin injection location and the second location is in the mold cavity at a location remote from the resin injection location. Since venting is preferably done through relatively cool resin to avoid entraining resin particles in the venting gas with consequent plugging, and since the resin in the portion of the mold cavity remote from the resin injection location is inherently cooler than the resin proximate the resin injection location, the gas may be vented from the second remote location before venting is feasible from the first or resin injection location, thereby shortening cycle time.

According to a further feature of the invention, the gas is vented sequentially from the first and second locations so that, for example, the gas may be vented from the first location until the gas pressure reaches a predetermined reduced level whereafter the gas may be vented from the second location to reduce the gas pressure substantially to ambient.

According to a further feature of the invention, the gas is injected into the resin at the first location to form a first hollow in the resin and the gas is injected into the resin at the second location to form a second hollow in the resin. This arrangement allows a suitable hollow to be formed in the resin even in resin locations which are not amenable to the formation of a hollow from the gas injected at the first location.

According to a further feature of the invention, the injection of the gas at the second location is continued until the hollow formed by the gas at the second location joins the hollow formed by the gas injected at the first location to provide a single hollow in the resin.

In the disclosed embodiments, the venting at the first and second locations may be accomplished either by selectively controlling valve means associated with the gas injection apparatus at the first and second locations or by retracting the nozzle or other gas injection apparatus at either the first or second location.

In one embodiment of the invention, the first gas injection location corresponds to the resin injection location and the second gas injection location is at a location proximate the end of the cavity remote from the resin injection location.

In another embodiment of the invention, the first gas injection location corresponds to the resin injection location and the second gas injection location is at a location in the cavity relatively proximate the resin injection location.

In another embodiment of the invention, the first gas injection location corresponds to the resin injection location and two further gas injection locations are provided in the cavity proximate opposite ends of the cavity.

In another embodiment of the invention, the second gas injection location is at a location remote from the resin injection location and the first gas injection location is at a location relatively proximate the resin injection location but not at the point of resin injection. For example, the first gas injection location may be in the sprue or runner between the resin injection location and the cavity or may be at the end of the cavity opposite the second gas injection location. This specific arrangement is especially suitable for hot runner applications.

In another embodiment of the invention, the second gas injection location is upstream of the mold cavity.

BRIEF DESCRIPTION OF THE DRAWINGS

FIGS. 5 and 6 are detail views showing modifications of the apparatus of FIG. 1;

FIG. 7 is a cross-sectional view of another embodiment of the invention gas injection apparatus;

FIG. 8 is a detail view of a portion of the apparatus of FIG. 7;

FIG. 10 is a detail view showing a modification of the apparatus of FIG. 9;

DETAILED DESCRIPTION OF THE PREFERRED EMBODIMENT

The invention gas injection apparatus and methodology is intended for use in association with a gas assisted injection molding process of the type in which hot resin is injected into a mold, gas is injected into the resin to fill out the mold cavity with resin, the gas is held at a pressure while the resin sets up, the gas is vented from the mold, and the mold is opened to remove the molded part. The part to be molded will typically have thicker and thinner portions and the thicker portions will act as an internal runner system to define a flow path for the gas. Since the thicker portions have a significantly higher resin melt temperature, the gas will follow the path of least resistance in the resin material and the thicker portions will continue to flow by virtue of the gas pressure so as to fill out the mold with the resin. Gas pressure is maintained within the mold in the hollow portion of the part until such time as the cooling cycle for the part is sufficient and the resin material has cured, whereafter the gas pressure is suitably vented and the mold is opened to remove the part.

Figure 1:
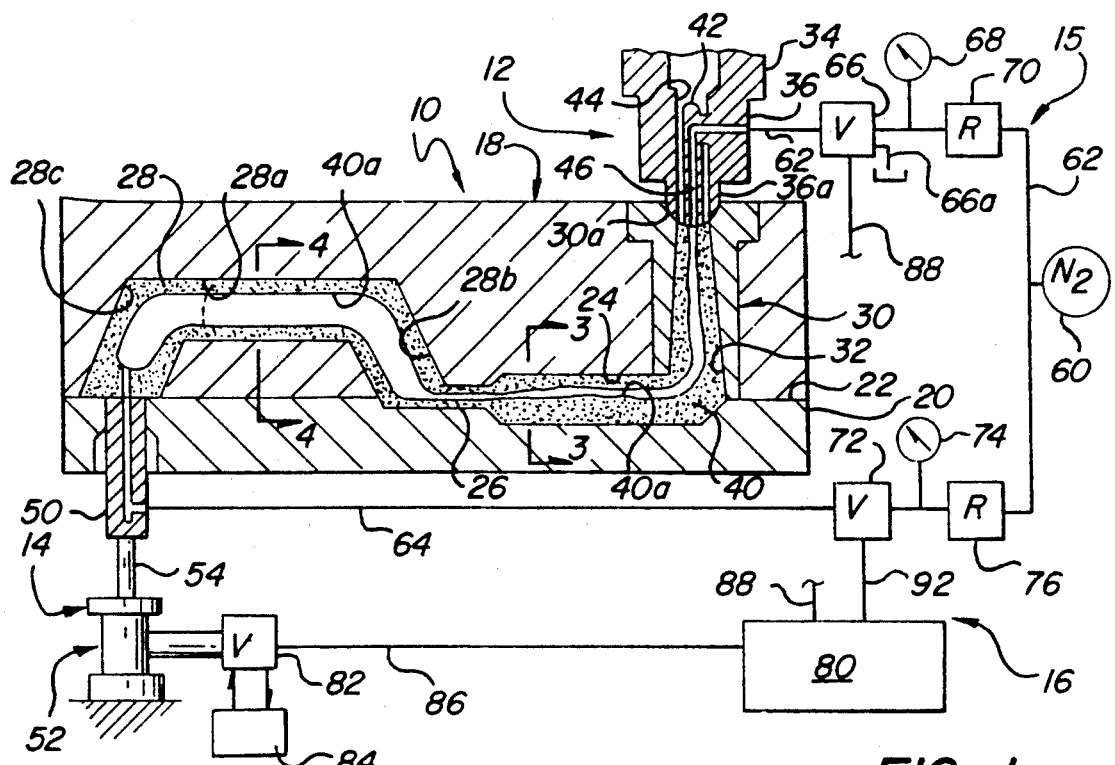
FIG. 1 is a cross-sectional view of a gas injection apparatus according to the invention.

The gas injection apparatus seen in FIG. 1, broadly considered, includes a mold 10; an injection molding assembly 12; a nozzle assembly 14; a gas system 15; and a control system 16.

Mold 10 includes upper and lower mold halves 18 and 20 which meet at a part line 22 and which coact to define a runner 24, a gate 26, and a mold cavity 28. Mold cavity 28 conforms to the shape of the part to be molded. For example, for a part having a U-shaped cross section, cavity 28 may include a main body portion 28a, a right portion 28b communicating at its lower end with gate 26, and a left portion 28c. A sprue bushing 30 is received in upper mold half 18 and defines a sprue 32 communicating at its lower end with runner 24 and opening at its upper end in a spherical seat 30a defined at the upper end of the sprue bushing.

Injection molding assembly 12 includes an injection molding machine 34 and an injection nozzle 36 including a spherical nozzle tip 36a adapted to be seated in sprue bushing seat 30a. A screw or plunger (not shown) of injection molding machine 34 is actuated in known manner to force resin through the outlet of nozzle tip 36a so as to inject a quantity of hot resin 40 through sprue 32, runner 24, gate 26, and into cavity 28. The quantity of resin injected into the mold cavity is a "short shot," that is, less than the amount required to totally fill mold cavity 28. The short shot may, for example, fill cavity 28 as far as the dash line seen in FIG. 1 whereafter the pressurized gas is introduced through the nozzle 36 to form a gas passage or hollow 40a within the resin in the sprue, runner, gate, and cavity, and totally fill the mold cavity with resin.

The nozzle 36 seen in FIG. 1 may be of any type capable of injecting both resin and gas and may, for example, be of the type shown in applicant's co-pending U.S. patent application Ser. No. 596531, filed Oct. 12, 1990, and including a central portion 42 positioned within the resin passage 44 and defining a gas passage 46 opening at its lower end in spherical nozzle tip 36a so that resin may be introduced into the sprue through resin passage 44, flowing around central portion 42, and gas may thereafter be introduced into the mold through gas passage 46.

Nozzle assembly 14 may, for example, be of the type shown in applicant's U.S. Pat. No. 5,044,924 and includes a nozzle 50 controlled by a hydraulic cylinder 52. Nozzle 50 is received in a counterbore 20a opening in the lower face 20b of lower mold half 20 with the upper end of the nozzle slidably received in a bore 20c opening at its upper end in cavity portion 28c. The lower end of nozzle 50 is connected to the piston rod 54 of cylinder 52 so that suitable actuation of cylinder 52 will move nozzle 50 between the solid line position seen in FIGS. 1 and 2 in which the upper end 50a of the nozzle communicates with the lower edge 28d of cavity portion 28c, as defined by part line 22, (the injection position) and a lowered or retracted position, (the venting position), seen in dash lines in FIG. 2, in which the upper end 50a of the nozzle has been moved to a position below the shoulder 20d interconnecting bore 20c and counterbore 20a. A central passage 50b extends vertically through the nozzle and a ball check valve 56 is interposed in passage 50b to allow upward flow of gas in passage 50b but preclude downward flow of resin through passage 50b. Alternatively, nozzle 50 may be replaced by a hollow blow pin of the type seen at 110 in FIG. 7 in which case venting would be accomplished utilizing a suitable control valve.

Gas system 15 includes a suitable source of nitrogen 60; a conduit 62 interconnecting source 60 and nozzle gas passage 46; a conduit 64 interconnecting source 60 and nozzle passage 50b; a control valve 66 in conduit 62 and including a vent line 66a; a pressure gage 68 in conduit 62; a gas pressure regulator 70 in conduit 62; a control valve 72 in conduit 64; a pressure gage 74 in conduit 64; and a gas pressure regulator 76 in conduit 64.

Control system 16 includes controller 80; a control valve 82 connected to a source 84 of pressurized hydraulic fluid and operative to deliver pressurized hydraulic fluid to cylinder 52 to actuate the cylinder; and electrical leads 86, 88, and 92 connected at their one ends to controller 80 and connected at their respective other ends to valve 82, valve 66, and valve 72.

In the operation of the apparatus of FIG. 1, a resin short shot is delivered to the mold cavity from the injection molding machine in known manner with the front of the charge assuming the dash line position seen in FIG. 1; nitrogen is supplied from source 60 through valve 66 at a pressure determined by the setting of regulator 70 for passage through nozzle gas passage 46 and into the resin short shot 40. The gas acts in known manner to form the hollow 40a within the resin and to move the resin front from the dash line position seen in FIG. 1 to the solid line position in which resin totally fills mold cavity 28 including left cavity portion 28c. The gas will typically pack out the resin against the walls of the mold cavity and form an outer resin wall or shell 40b between cavity 40a and the surface of the mold cavity.

Following the fill out of the mold by the nitrogen introduced through nozzle 36, valve 66 is moved by controller 80 to a closed position to preclude escape of gas from hollow 40a through conduit 62, and the controller opens valve 72 to deliver nitrogen at the pressure established by regulator 76 through conduit 64 to the central passage 50b of nozzle 50. Pressure regulator 76 is set to deliver gas to passage 50d at a pressure that is in excess of the pressure of the gas within the hollow 40a. For example, if the gas pressure within the hollow 40a, following the gas injection through nozzle 36, is 3000 psi then regulator 76 may be set to deliver pressure to passage 50b at 4000 psi so that a 1000 psi pressure differential will exist across the thickness of resin wall 40b proximate the upper end 50a of the nozzle, and this pressure differential will result in the creation of a passage 100 in the resin wall 40b in alignment with nozzle passage 50b with passage 100 communicating at its upper end with hollow 40a. The gas entering hollow 40a through passage 100 at 4000 psi has the effect of further packing out the resin against the walls of the cavity so as to improve the quality of the molded part. Further, the creation of the passage 100 facilitates the venting of the part following the setting up of the resin in the mold cavity 28.

Figure 3:
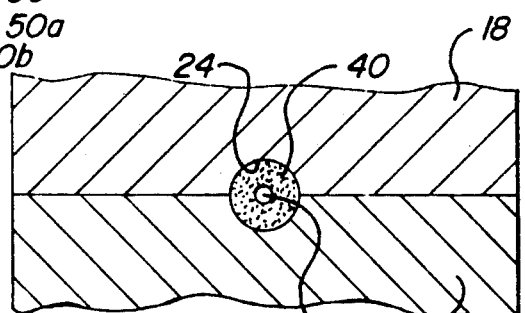
FIGS. 3 and 4 are cross-sectional views taken respectively on lines 3—3 and 4—4 of FIG. 1.

Specifically, the resin in the sprue, runner, and cavity is progressively cooler and progressively more viscous in proportion to the distance from the injection nozzle 36. The downward temperature gradient moving progressively further away from the injection nozzle is the result of the longer time that the "first in" resin has had to cool; the further result of the continuing contact of the hot nozzle 36 with the sprue bushing; and the further result of the fact that (as seen by a comparison of FIGS. 3 and 4) the wall thicknesses of the article, surrounding the hollow 40a, can be significantly less than the thicknesses of the resin walls in the sprue and runner surrounding the central gas passage 40a in the sprue and runner.

Accordingly, at a given Δt after the initial injection of the resin into the mold, the resin in the remote left cavity portion 28c is relatively cool and relatively viscous; the resin in the main body cavity portion 28a is somewhat hotter and less viscous; the resin in the right cavity portion 28b is yet hotter and even less viscous; and the resin in the runner and sprue is very hot with yet lower relative viscosity. Consequently, if an attempt is made at time Δt to vent the hollow 40a in conventional manner through nozzle 36, the escaping gas would necessarily pass through the relatively hot portions of the resin with the result that particles of resin could likely be entrained in the escaping gas and these particles could severely restrict or ultimately totally plug the sprue end or the gas passage 46 in the nozzle 36 with the result that the venting process could not be completed.

By contrast, venting may be more readily accomplished at time Δt through passage 100 (upon retraction of nozzle 50) since the escaping gas in this situation is moving through relatively solid, relatively cool resin material so as to minimize the possibility of entraining resin particles in the escaping gas with consequent blockage of the passage. As a result, venting of the hollow 40a may be achieved through passage 100 substantially before successful venting can be achieved through nozzle passage 46 so that the nozzle 50, in addition to facilitating the packing out of the resin against the mold surfaces, also shortens the cycle time to produce a given part.

Figure 2:
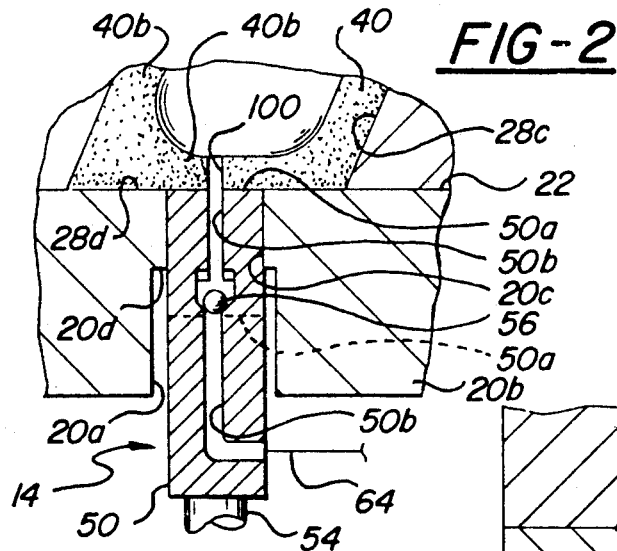
FIG. 2 is a detail view of a portion of the apparatus of FIG. 1.

It will be understood that the venting of the hollow 40a through passage 100 is accomplished by suitable retraction of the piston rod 54 of cylinder 52 to move the nozzle 50 from its solid line position of FIGS. 1 and 2 to the dash line position of FIG. 2 whereby the gas may escape through bore 20c and counter bore 20a to ambient whereafter the cylinder may again be extended to return the nozzle to its solid line position for the next cycle.

As an alternative to total venting through passage 100, the venting of hollow 40a may be accomplished by a combination of venting through passage 100 and nozzle 50 (by retracting the nozzle) and venting through nozzle passage 46 (by moving valve 66 to a position in which gas is vented through vent line 66a). For example, the venting may be accomplished simultaneously through passages 100 and 46 or the venting may be initially accomplished through passage 46 until a certain predetermined pressure is achieved within the hollow 40a, whereafter valve 66 may be closed to terminate venting through passage 46 and cylinder 52 retracted to begin venting through passage 100 and allow the gas pressure to fall to ambient from the predetermined value established by the initial venting through nozzle 36. Alternatively, venting may be performed only through nozzle passage 46 until such time as the entrained molten resin particles plug up the gate and/or runner and/or sprue, after which the venting may be completed through passage 100.

In the modification of the FIG. 1 molding apparatus seen in FIG. 5, the venting of gas through the sprue passage, rather than being controlled by a vent line associated with the valve 66, is accomplished by retracting the nozzle utilizing a cylinder 102 acting on a bracket 104.

In the modification of the FIG. 1 molding apparatus seen in FIG. 6, a one-way check valve 104 is provided in nozzle 36 so as to preclude venting of gas through nozzle 36 in this modification. Valve 104 also serves to prevent total resin block of gas passage 62 when high differential pressures are used.

In the embodiment of the invention seen in FIG. 7, components and features that find correspondence in the FIG. 1 embodiment are given like reference numerals. Thus, the apparatus of FIG. 5 includes a mold 10 including upper and lower mold halves 18 and 20 defining a part line 22 and coacting to define a mold cavity 28 having a main body portion 28a and left and right portions 28c and 28b; an injection nozzle 36 secured to an injection molding machine 34 with nozzle tip 36a received in the spherical seat 30a of a sprue bushing 30; a pressure regulator 70 and a valve 66 interposed in a gas line 62 extending between a source 60 of nitrogen and the injection nozzle 36; a valve 72 and a pressure regulator 76 interposed in a gas line 64 extending from nitrogen source 60; and a controller 80 provided to control the delivery and pressure of gas supplied to conduits 62 and 64 from source 60.

In contrast to the apparatus of FIG. 1, sprue 30 opens directly into the main body portion 28a of cavity 28 proximate left cavity portion 28c, rather than accessing the right end of the cavity through a gate and runner system, and the retractable nozzle assembly 14 of the FIG. 1 is replaced by a hollow blow pin or nozzle 110 fixedly mounted in bore 20c of the lower mold half and having an upper end 110a communicating with the lower surface 28d of left cavity portion 28c. The lower end of the central passage 110b of the nozzle 110 communicates with conduit 64 so that nitrogen may be supplied from source 60 through regulator 76 and valve 72 to the central passage 110b of the nozzle for delivery to the mold cavity.

In the arrangement of FIG. 7, with the sprue opening proximate the left portion 28c of the cavity 28, the "short shot" of resin from the injection molding machine 34 will inherently fill the cavity portion 28c and the majority of the main body cavity portion 28a but (as shown by the dash line) will leave the right hand cavity portion 28b unfilled so that the subsequent injection of nitrogen through nozzle 36 will have the effect of filling out cavity portion 28b and creating a hollow 40a within the resin 40 that achieves little or no intrusion into the resin in the left cavity portion 28c but extends completely into the right cavity portion 28b.

Following the injection of the "short shot" of resin into the cavity 28 and the subsequent injection of gas into the resin through nozzle 36 to form the hollow 40a, valve 72 is opened by controller 80 to provide nitrogen, at a pressure determined by the setting of regulator 76, to nozzle 110 for passage through central passage 110b and into the cavity proximate the lower edge 28d of the left cavity portion 28c. The gas emerging from the upper end of nozzle passage 110b will form a hollow 40b extending upwardly within the resin in cavity portion 28c toward the left hand end of the hollow 40a.

The supply of nitrogen through conduit 64 to nozzle 110 may be terminated prior to the time that the hollow 40b joins with hollow 40a, thereby leaving a partition 40c between the hollows, or, preferably, the supply of gas may be continued until such time as the hollow 40b joins the hollow 40a, as seen in FIG. 8, to form a continuous hollow 40d within the part. The pressure at which the nitrogen is supplied through nozzle 36 to form the hollow 40a and the pressure at which the gas is supplied through nozzle 110 to form the hollow 40b will vary depending upon the parameters of the particular application but, in general, gas will be supplied to nozzle 110, following the formation of hollow 40a, at a pressure that is substantially higher than the pressure of the gas in the hollow 40a so as to facilitate the breaking through of the hollow 40b into the hollow 40a to form the single continuous hollow 40c.

If the introduction of gas through nozzle 110 is terminated prior to the joining of hollows 40a and 40b, the venting of the gas will be achieved by venting hollow 40a through nozzle 36 (utilizing vent line 66a) and venting hollow 40b through nozzle 110 (utilizing a vent line 72a of valve 72). If, as is preferred, the supply of gas to nozzle 110 is continued until the hollows 40b and 40a join up to form the single hollow 40d, the venting of the gas from the molded part may be achieved either through nozzle 36, through nozzle 110, or through both nozzles. In the latter scenario, the nozzles may be opened simultaneously or sequentially depending upon the parameters of the particular application.

Figure 4:
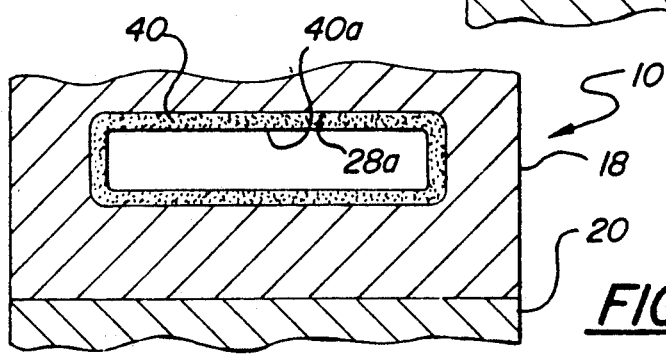
Figure 9:
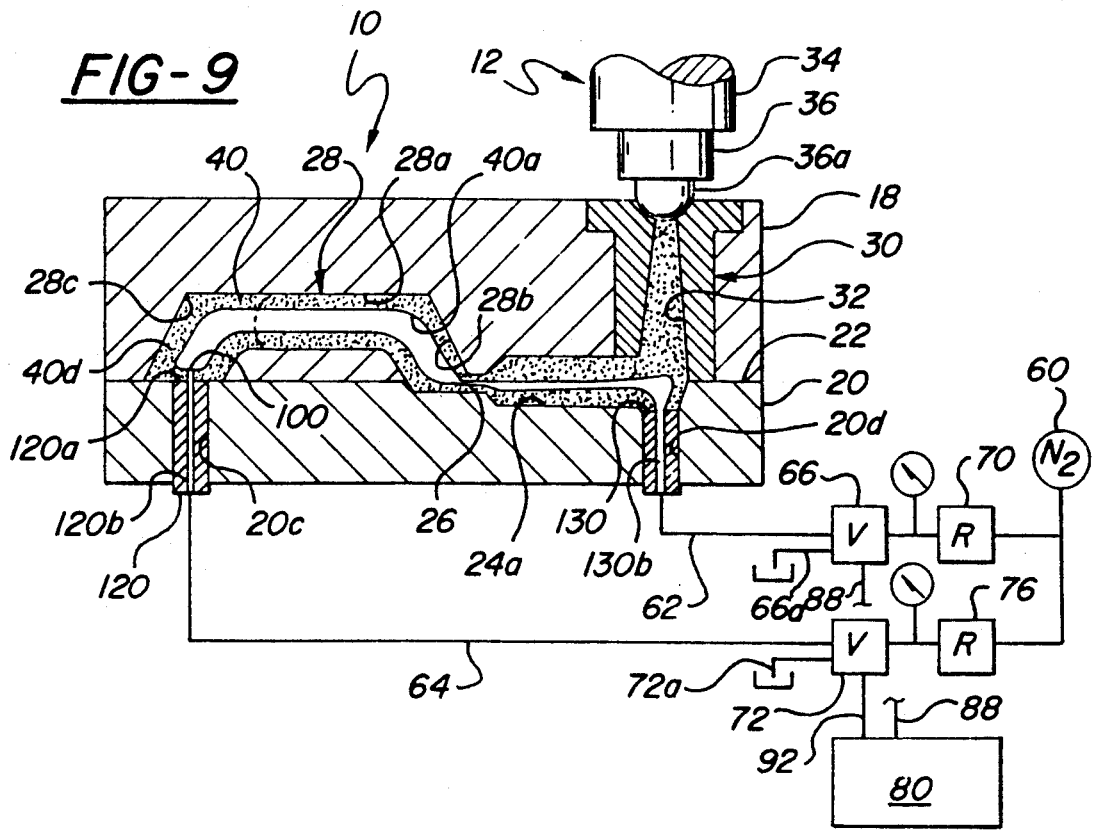
FIG. 9 is a cross-sectional view of a further embodiment of the invention gas injection apparatus.

Alternatively, blow pin 110 may be replaced by a nozzle assembly of the type shown by nozzle assembly 14 in FIG. 9. It will be understood that the mold cavity has a third dimension, as seen in FIG. 4, and that nozzles 36 and 110 may be offset in this third dimension.

In the embodiment of the molding apparatus seen in FIG. 9, components and features corresponding to similar components and features in the FIG. 1 embodiment are given like reference numerals. Thus, the apparatus of FIG. 7 includes a mold 10 including upper and lower mold halves 18 and 20 defining a part line 22 and coacting to define a runner 24, a gate 26, and a cavity 28 having a main body portion 28a, a left portion 28c, and a right portion 28b; a sprue 30 positioned in upper mold half 18 and defining a spherical seat 30a receiving the spherical tip 38a of a nozzle 36 secured to an injection molding machine 34; a valve 66 and pressure regulator 70 interposed in a conduit 62 communicating with a source of nitrogen 60; a valve 72 and pressure regulator 76 interposed in a conduit 64 communicating with source 60; and a controller 80 controlling valves 66 and 72 via leads 88 and 92.

In contrast to the apparatus of FIG. 1, a hollow blow pin or nozzle 120 is fixedly mounted in bore 20c in lower mold half 20 with the upper end 120a of the nozzle communicating with the lower surface 28d of left cavity portion 28c and a further nozzle or hollow blow pin 130 is fixedly mounted in a bore 20d in lower mold half 20 with the upper end 130a of the nozzle vertically aligned with sprue 32 and communicating with the lower surface 24a of runner 24. The lower end of the central hollow passage 20b of nozzle 120 communicates with conduit 64 and the lower end of the central passage 130b of nozzle 130 communicates with conduit 62.

In the operation of the embodiment of FIG. 9, a short shot is delivered through nozzle 36 whereafter nitrogen is introduced through nozzle 130 to form the hollow 40a in the injected resin whereafter nitrogen is introduced through nozzle 120, at a pressure substantially higher than the pressure of the gas within the preexisting hollow 40a, to form a passage 100 extending through the resin wall 40b and into the hollow 40a in the cavity portion 28c. The relatively high pressure gas introduced through nozzle 120 and through the passage 100 created in the resin wall 40b has the effect of further packing out the resin in the mold cavity to improve the quality of the molded part and the passage 100 provides flexibility with respect to venting of the gas from the molded part.

Specifically, the gas may be totally vented from the part through the nozzle 120 with the venting taking place as soon as the article itself has sufficiently set and the runner may still be flowable. Alternatively, the gas may be vented from the mold simultaneously through nozzles 120 and 130 or may be vented sequentially with the nozzle 130 first being opened via valve vent line 66a to lower the gas pressure in the mold to a predetermined level whereafter the nozzle 120 is opened via valve vent line 72a to complete the venting of the cavity and lower the cavity pressure to ambient.

In the modification of the FIG. 9 molding apparatus as seen in FIG. 10, the nozzle 130, rather than opening in the runner 24 in underlying relation to the sprue, opens at the lower end of right cavity portion 28b so that the gas may be introduced through nozzle 130 directly into the right portion of the cavity to accomplish the initial formation of the hollow 40a in the resin and so that the gas may be vented from the cavity directly from the cavity portion 28b.

Alternatively, the blow pins 120 and 130 in FIGS. 9 or 10 may be replaced by nozzle assemblies of the type seen at 14 in FIG. 1. The embodiments of the invention shown in FIGS. 9 and 10 are especially suitable for hot runner applications wherein the gas nozzle is positioned downstream of the hot runner.

Figure 11:
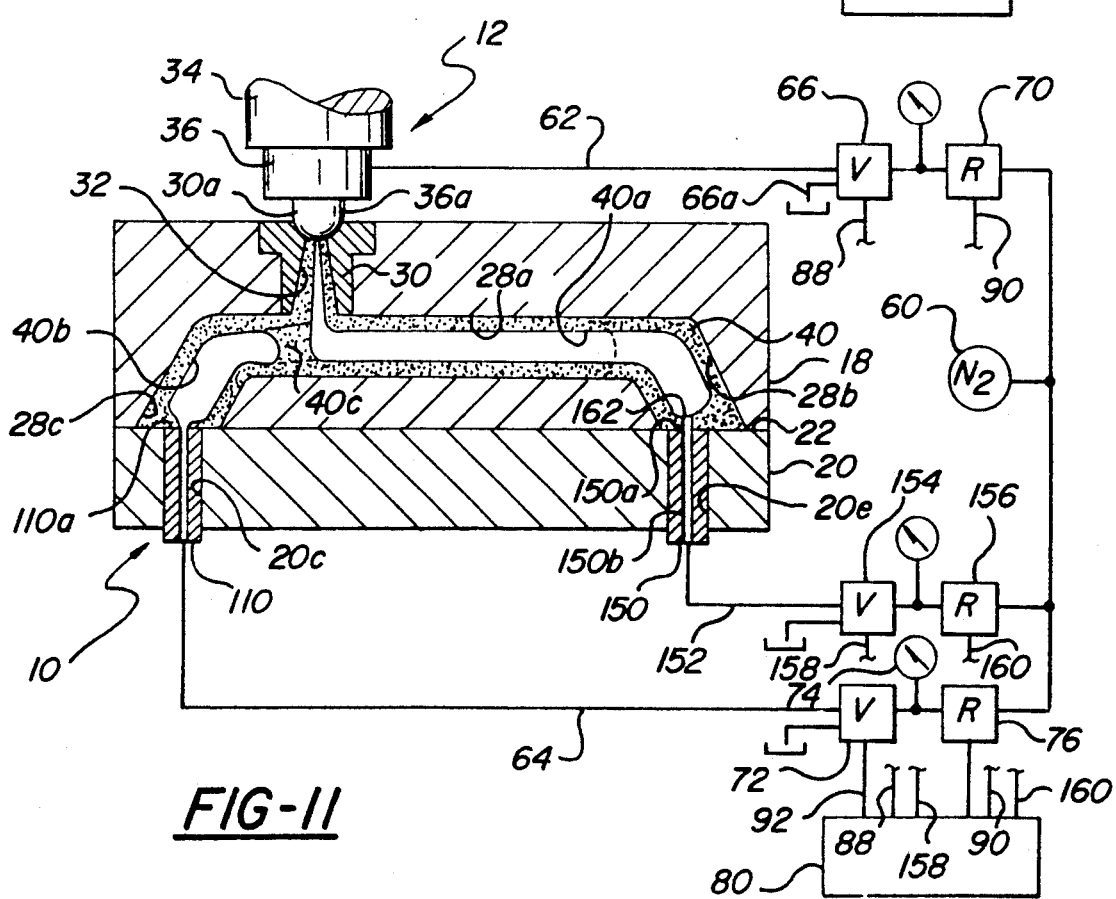
FIG. 11 is a cross-sectional view of a further embodiment of the invention gas injection apparatus.

The embodiment of the invention seen in FIG. 11 is generally similar to the embodiment seen in FIG. 7 and like components and features in the two embodiments are given like reference numerals. Thus, the mold comprises upper and lower mold halves 18 and 20 defining a part line 22 and coacting to define a mold cavity having a main body portion 28a, a left portion 28c, and a right portion 28b; a sprue bushing 30 defines a sprue 32 opening at its upper end in a spherical seat 30a and opening at its lower end in the main body portion 28a of the cavity proximate the left cavity portion 28c; a nozzle tip 36 of a nozzle 36 secured to a injection molding machine 34 is positioned in sprue seat 30a; a nozzle 110 is fixedly mounted in bore 20c of the lower mold half with the upper end of the central bore 110b of the nozzle opening in the lower end of cavity portion 28c; conduit 62 extends between the nozzle 36 and a nitrogen source 60 and includes a valve 66, a gage 68, and a pressure regulator 70; a conduit 64 extends between nozzle 110 and source 60 and includes a valve 72, a pressure gage 74, and a pressure regulator 76; and a controller 80 operates to control the delivery of gas to the nozzles and venting of gas from the mold utilizing the various valves and pressure regulators.

In contrast to the embodiment of FIG. 7, the embodiment of FIG. 11 further includes a nozzle 150 fixedly mounted in a bore 20e in lower mold half 20 with the upper end 150a of the nozzle opening in the lower end of right cavity portion 28b generally flush with the lower surface of cavity portion 28b. Nozzle 150 includes a central passage 150b opening at its upper end in cavity portion 28b and connected at its lower end to a conduit 152 connected to nitrogen source 60. A valve 154 and a pressure regulator 156 are interposed in conduit 152 and leads 158 and 160 respectively connect valve 154 and regulator 156 to controller 80.

In the operation of the apparatus of FIG. 11, a short shot is delivered through nozzle 36 to the mold cavity with the short shot, as with the embodiment of FIG. 5, totally filling the left cavity portion 28c, partially filling the central portion 28a, and leaving the right cavity portion 28b void whereafter gas is delivered through nozzle 36 to complete the fill out of the resin in the mold and create the hollow 40a whereafter gas is delivered to nozzle 110 to create the hollow 40b which may or may not be continued to the point of joining hollow 40a, and gas is delivered to nozzle 150 to create a passage 162 through the resin wall to allow the delivery of gas through the nozzle 150 into the hollow 40a to augment the packing out of the resin against the walls of the cavity.

Venting of the mold may be accomplished through nozzle 36, through nozzle 110, through nozzle 150, or through any combination of the three nozzles. In the event that hollow 40b is not communicated with hollow 40a it will of course be necessary to vent hollow 40b through nozzle 110 and vent hollow 40a either through nozzle 36 or through nozzle 150 or through both nozzles 36 and 150. As with the embodiments of FIGS. 1 and 9, the pressure at which gas is delivered to nozzle 150 is higher than the pressure created within the hollow 40a by the introduction of gas through the nozzle 36 to allow the gas to break through the resin wall and enter the hollow 40a to augment the packing out process. For example, if the pressure within the hollow 40a following the initial injection of gas through the nozzle 36 is 3000 psi, the gas may be supplied to nozzle 150 at a pressure of 4000 psi.

Figure 12:
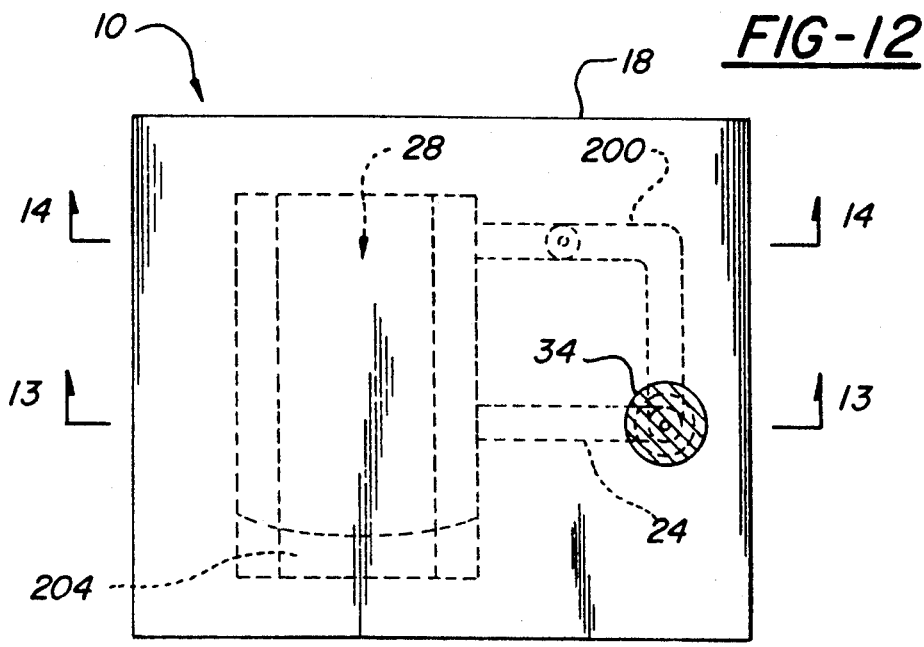
FIGS. 12, 13 and 14 are views of a yet further embodiment of the invention gas injection apparatus.
Figure 13:
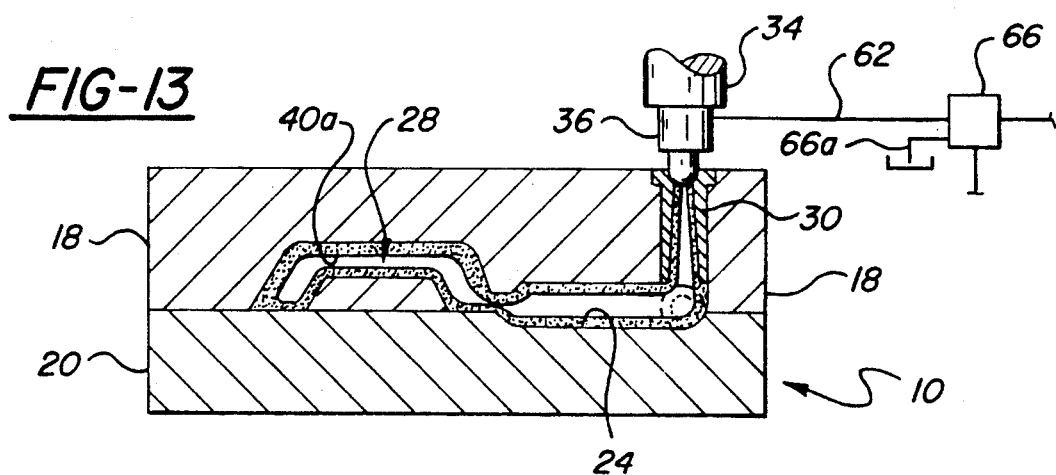
Figure 14:
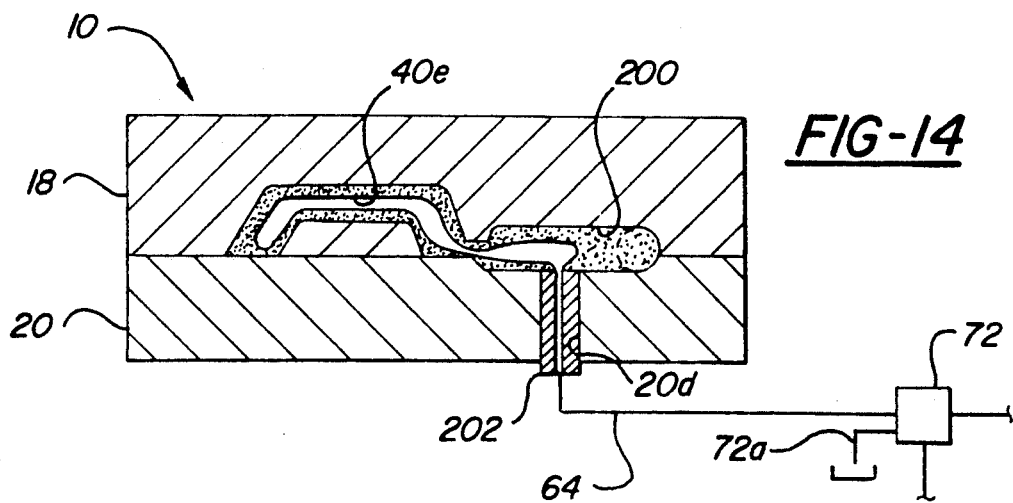

In the embodiment of the invention seen in FIGS. 12, 13 and 14, a multiple runner system is employed, including runner 24 and a second runner 200 communicating with mold cavity 28 proximate one end thereof, and a nozzle or blow pin 202 is provided in a bore 20d in lower mold half 20 opening at its upper end in runner 200 proximate the entry of runner 200 into cavity 28. Nozzle 202 is thus positioned upstream of the mold cavity.

In the operation of the apparatus of FIGS. 12-14, resin is delivered from the nozzle 36 downwardly through sprue 30 for passage through runners 24 and 200 into mold cavity 28. Since runner 200 accesses the mold cavity proximate one end thereof and runner 24 accesses the mold cavity proximate the center of the mold cavity, the resin short shot will tend to fill up the mold cavity 28 proximate runner 200 and proximate runner 24 but will leave a space 204 in advance of the forward edge of the short shot. Following the injection of the resin, gas is injected through nozzle 36 to fill out the space 204 and pack out the resin within the mold cavity. The hollow 40 formed by the gas injection through the nozzle 36 will pass through runner 24 and into the portion of the resin in the mold cavity proximate runner 24 but will only extend to a limited extent into runner 200, and, in any event, will not extend into the resin in the mold cavity through the runner 200. Following the injection of gas through the nozzle 36, gas is injected through the nozzle 202 to form a further hollow 40e within the resin extending through the runner 200 and into the mold cavity proximate the runner 200. The injection of gas through nozzle 202 may be continued until the hollow 40e joins the hollow 40a to form a single hollow within the part or, alternatively, the gas injection through nozzle 200 may be terminated prior to the establishment of communication between hollows 40e and 40a. In the event that the injection of gas through nozzle 202 is continued until the hollows 40e and 40a join to form a single hollow, the single hollow can be subsequently vented through nozzle 36 or through nozzle 202, or through a combination of both nozzles. Conversely, if the delivery of gas through nozzle 202 is terminated prior to the establishment of communication between hollows 40a and 40e, the venting of hollow 40a will be accomplished through nozzle 36 and the venting of hollow 40e will be accomplished through nozzle 202.

The invention gas injection apparatus and methodology will be seen to augment the packing out of the resin in the mold cavity to improve the quality of the molded part; will be seen to allow effective venting of the molded article at an earlier time in the molding cycle without danger of plugging the article so as to reduce the overall cycle time; will be seen to save on the amount of resin required to form a given part; and will be seen to minimize down time for the molding apparatus by minimizing or eliminating plugging of the nozzles during the venting process.

Whereas preferred embodiments of the invention have been illustrated and described in detail, it will be apparent that various changes may be made in the disclosed embodiments without departing from the scope or spirit of the invention.

I claim:

1. A method of providing gas assistance to a resin injection molding process in which hot resin is injected into a mold, gas is injected into the resin to fill out the mold cavity, the resin cools, the gas is vented, and the mold is opened to remove the molded part, characterized in that the gas is injected into the resin at a first location to form a gas hollow within the resin and completely fill out the mold cavity with resin and is thereafter injected into the resin at a second location spaced from the first location to form a second hollow within the resin.

2. A method of providing gas assistance to a resin injection molding process in which hot resin is injected into a mold, gas is injected into the resin to fill out the mold cavity, the resin cools, the gas is vented, and the mold is opened to remove the molded part, characterized in that the gas is injected into the resin at a first location to form a gas hollow in the resin and completely fill out the mold cavity with resin and the gas is thereafter injected at a second location to create a passage in the resin extending into the hollow.

3. A method according to any one of claims 1 or 2 wherein the pressure at which the gas is injected at said first and second locations is separately regulated.

4. A method according to claim 3 wherein the gas is injected into the resin at said first location at a relatively low pressure and at said second location at a relatively high pressure.

5. A method according to any one of claims 1 or 2 wherein the gas is vented at one of said locations.

6. A method according to any one of claims 1 or 2 wherein the gas is vented at said first location and at said second location.

7. A method according to claim 6 wherein the gas is vented at said first location and at said second location in a sequential manner.

8. A method according to any one of claims 1 or 2 wherein said first location comprises the resin injection location.

9. A method according to any one of claims 1 or 2 wherein said first location is downstream of the resin injection location.

10. A method according to any one of claims 1 or 2 wherein the second location is in the mold cavity.

11. A method according to any one of claims 1 or 2 wherein said second location is upstream of the mold cavity.

12. A method according to any one of claims 1 or 2 wherein at least one location utilizes a nozzle for gas injection and the gas is vented by retracting the nozzle at said one location.

13. A method of providing gas assistance to a resin injection molding process in which hot resin is injected into a mold, gas is injected into the resin to fill out the mold cavity, the resin cools, the gas is vented, and the mold is opened to remove the molded part, characterized in that the gas is injected into the resin at a first location to form a gas hollow within the resin and push the resin against the mold cavity to form a resin wall between the hollow and the mold cavity whereafter gas is injected into the resin at a second location to form a passage extending through the resin wall and into the hollow.

14. A method according to claim 13 wherein the gas is vented to substantially ambient pressure through said passage.

15. A method of providing gas assistance to a resin injection molding process in which hot resin is injected into a mold, gas is injected into the resin to fill out the mold cavity, the resin cools, the gas is vented, and the mold is opened to remove the molded part, characterized in that the gas is injected into the resin at a first location to form a gas hollow within the resin and fill out the mold cavity with resin whereafter gas is injected into the resin at a second location to form a second hollow in the resin.

16. A method according to claim 15 wherein the first and second hollows join to form a single hollow in the resin.

17. A method of providing gas assistance to a resin injection molding process in which hot resin is injected into a mold, gas is injected into the resin to fill out the mold cavity, the resin cools, the gas is vented, and the mold is opened to remove the molded part, characterized in that the gas is injected into the resin at a first location at a relatively low gas pressure to form a gas hollow within the resin and completely fill out the mold cavity with resin and is thereafter injected into the resin at a second location at a relatively high gas pressure.

18. A method of providing gas assistance to a resin injection molding process in which hot resin is injected into a mold, gas is injected into the resin to fill out the mold cavity, the resin cools, the gas is vented and the mold is opened to remove the molded part, characterized in that the gas is initially injected into the resin at the resin injection location to form a gas hollow within the resin and completely fill out the mold cavity, thereafter gas is injected at a location remote from the resin injection location creating a passage into the hollow, and thereafter the gas is vented from the hollow through the passage at the remote location.

19. A method according to claim 18 wherein the gas is injected through a gas passage at each of said locations and wherein the method includes the further step of providing means operative during resin and gas injection to prevent upstream resin flow through the gas injection passages at either of said locations.

20. A method of providing gas assistance to a resin injection molding process in which hot resin is injected into a mold, gas is injected into the resin to fill out the mold cavity, the resin cools, the gas is vented, and the mold is opened to remove the molded part, characterized in that the gas is injected into the resin at first and second spaced locations, the gas injection is separately controlled at the first and second locations, and the gas is vented at one of said locations to a first reduced pressure and is thereafter vented at the other location to substantially ambient pressure.

* * * * *